(12) United States Patent
Kunz et al.

(10) Patent No.: US 10,603,828 B2
(45) Date of Patent: Mar. 31, 2020

(54) INJECTION MOLDING DEVICE

(71) Applicant: The Procter & Gamble Company, Cincinnati, OH (US)

(72) Inventors: Marc Kunz, Georgeshausen (DE); Andreas Reuschenbach, Bad Soden (DE); Ralf Wustrack, Schwalbach (DE); Jörg Kotitschke, Waldems (DE)

(73) Assignee: The Procter & Gamble Company, Cincinnati, OH (US)

( * ) Notice: Subject to any disclaimer, the term of this patent is extended or adjusted under 35 U.S.C. 154(b) by 296 days.

(21) Appl. No.: 15/421,716

(22) Filed: Feb. 1, 2017

(65) Prior Publication Data

US 2017/0217059 A1 Aug. 3, 2017

(30) Foreign Application Priority Data

Feb. 1, 2016 (EP) .................... 16153620

(51) Int. Cl.
*B29C 45/40* (2006.01)
*B29C 45/37* (2006.01)
(Continued)

(52) U.S. Cl.
CPC ...... *B29C 45/4005* (2013.01); *B29C 45/0441* (2013.01); *B29C 45/162* (2013.01); *B29C 45/1775* (2013.01); *B29C 45/2681* (2013.01)

(58) Field of Classification Search
CPC ... B29C 45/12; B29C 45/376; B29C 45/2681; B29C 45/0441; B29C 45/1775; B29C 45/162; B29C 45/4005
See application file for complete search history.

(56) References Cited

U.S. PATENT DOCUMENTS 3,712,786 A * 1/1973 Aoki ............... B29C 45/262
264/318
5,196,213 A * 3/1993 Watanabe ........... B29C 45/4005
264/334
(Continued)

FOREIGN PATENT DOCUMENTS

CN 202965252 U 6/2013
DE 4243293 A1 6/1994
(Continued)

OTHER PUBLICATIONS

CM4425FQ Search Report and Written Opinion for Application No. 15421176 dated Jul. 13, 2016.

*Primary Examiner* — Joseph S Del Sole
*Assistant Examiner* — Jerzi H Moreno Hernandez
(74) *Attorney, Agent, or Firm* — Parker D. McCrary

(57) ABSTRACT

An injection molding device has a first mold half, an index plate that in a molding position is at least partly received in the first mold half, and an index plate axle connected with the index plate. The index plate axle is arranged for linear movement along its longitudinal axis relative to the first mold half so that the index plate can be moved between the molding position and a turning position in which the index plate can be rotated with respect to the first mold half. An adaptor plate, connected to the first mold half, has a drive and a first coupling element coupled with the drive. The first coupling element is arranged eccentric with respect to the longitudinal axis of the index plate axle.

9 Claims, 4 Drawing Sheets

(51) Int. Cl.
  *B29C 45/17*   (2006.01)
  *B29C 45/16*   (2006.01)
  *B29C 45/04*   (2006.01)
  *B29C 45/26*   (2006.01)

(56) References Cited

U.S. PATENT DOCUMENTS

| | | | |
|---|---|---|---|
| 5,310,331 A | 5/1994 | Wakebe et al. | |
| 6,790,027 B1* | 9/2004 | Callen | B29C 45/062 425/556 |
| 2003/0170339 A1* | 9/2003 | Ebner | B29C 45/1618 425/556 |
| 2006/0172036 A1* | 8/2006 | Rahnhofer | B29C 45/162 425/556 |
| 2007/0298254 A1* | 12/2007 | Cretin | B29C 45/162 428/364 |
| 2011/0229596 A1* | 9/2011 | Huang | B29C 45/162 425/556 |
| 2011/0256259 A1* | 10/2011 | Chen | B29C 45/4005 425/556 |
| 2012/0076890 A1* | 3/2012 | Huang | B29C 45/4005 425/556 |
| 2014/0023742 A1* | 1/2014 | Wang | B29C 45/162 425/130 |
| 2014/0239544 A1* | 8/2014 | Franksson | B29C 45/162 264/255 |
| 2017/0144352 A1* | 5/2017 | Yang | B29C 45/80 |

FOREIGN PATENT DOCUMENTS

| | | | |
|---|---|---|---|
| DE | 202004020290 U1 | 8/2005 | |
| DE | 102014001497 A1 | 10/2014 | |
| GB | 845080 A | 8/1960 | |
| GB | 1216557 A | 12/1970 | |
| JP | H0486231 A | 3/1992 | |
| WO | WO-2006018364 A1 * | 2/2006 | B29C 33/0083 |
| WO | WO2013001022 A1 | 1/2013 | |

* cited by examiner

INJECTION MOLDING DEVICE

FIELD OF THE INVENTION

The present invention is concerned with an injection molding device comprising an index plate and a drive for rotating the index plate.

BACKGROUND OF THE INVENTION

It is known that injection molding devices can be arranged for successive two-component or multi-component injection molding of articles within the same mold. These injection molding devices often comprise a mold having a first mold half and a second mold half that together form at least two different injection molding cavities, where each injection molding cavity has a first part-cavity formed in the first mold half and a second part-cavity formed in the second mold half. Articles can be made by first injection molding a first plastic component in a first of the two different injection molding cavities and then to move the semi-finished article from the first injection molding cavity into the second injection molding cavity, where the second plastic component is injected such that the second component at least partially covers the first component. Movement of the semi-finished article from the first cavity to the second cavity can be achieved by turning one of the mold halves in which the semi-finished article remains until it is aligned with the respective other part-cavity. The respective mold half is then arranged on a turntable. The turntable may be arranged for 180 degrees rotation. In case of further injection molding stations for injection molding of further plastic components, the turntable may be arranged for 120 degrees rotation or 90 degrees rotation. The mold half in which the articles remain may then have identical part-cavities. The other mold half then has different part-cavities.

In order to provide a higher flexibility of articles to be manufactured, it is also known to place the semi-finished articles on projections of an index plate (or: turn-tilt plate) that is arranged between the first mold half and the second mold half. After injection of the first component, the two mold halves are moved into an open position and only the index plate is linearly moved or rotated so that the semi-finished article (or the plurality of semi-finished articles, depending on the number of cavities at each molding station) is transported to the cavity (or cavities) of the successive molding station. Molding of the articles in the different molding stations may happen simultaneously, so that in each molding step a plurality of finished articles can be ejected from the mold.

It is an object of the present disclosure to provide an injection molding device that is improved over the prior art devices or that at least provides an alternative.

SUMMARY OF THE INVENTION

In accordance with one aspect there is provided an injection molding device comprising a first mold half, an index plate that in a molding position is at least partly received in the first mold half, an index plate axle connected with the index plate, which index plate axle is arranged for linear movement along its longitudinal axis relative to the first mold half so that the index plate can be moved between the molding position and a turning position in which the index plate can be rotated with respect to the first mold half, an adaptor plate connected with the first mold half, wherein the adaptor plate comprises a drive and a first coupling element coupled with the drive, which first coupling element is arranged eccentric with respect to the longitudinal axis of the index plate axle, and the first mold half comprises a second coupling element engaged with the first coupling element, the second coupling element is coupled with the index plate axle for rotating the index plate axle around the longitudinal axis.

BRIEF DESCRIPTION OF THE DRAWINGS

The present disclosure will be further elucidated by a detailed discussion of example embodiments, where reference is made to figures. In the figures

DETAILED DESCRIPTION OF THE INVENTION

Figure 1:
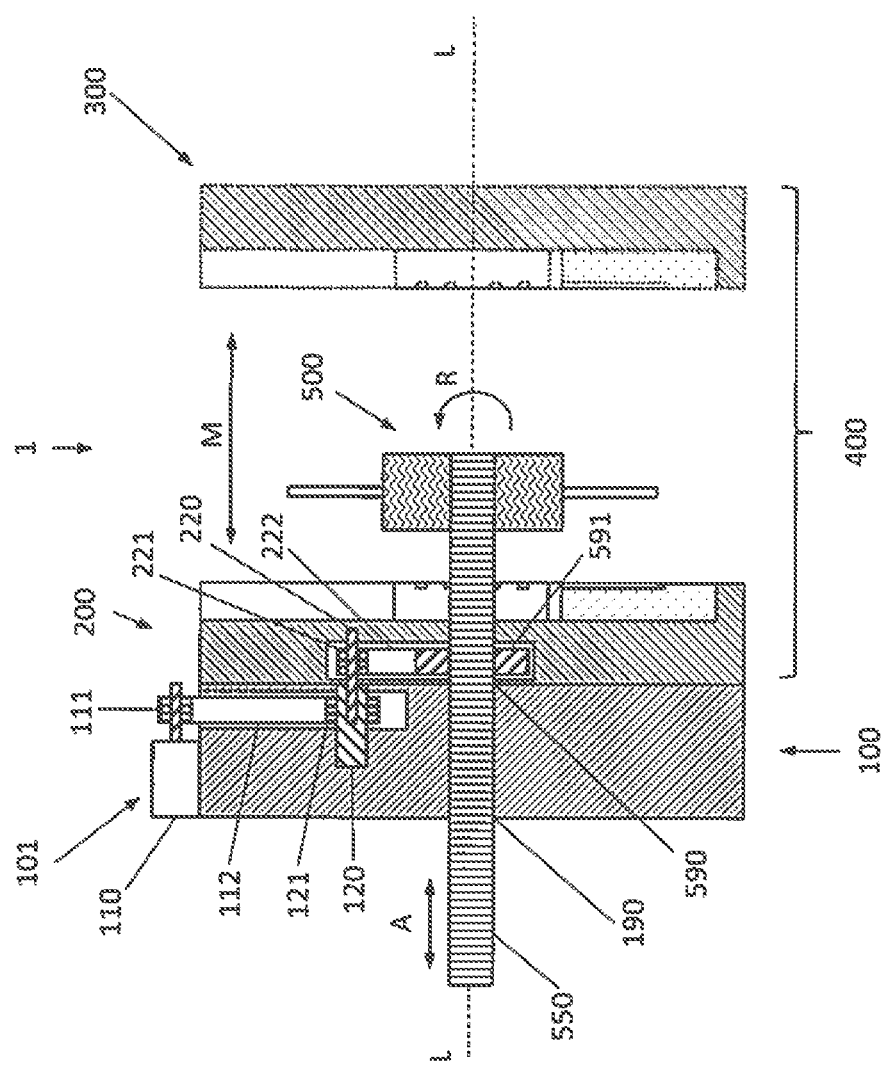
FIG. 1 is schematic cross sectional cut through an injection molding device in accordance with the present disclosure.

The present disclosure is concerned with an injection molding device that has an index plate via which semi-finished injection molded articles can be moved between different molding stations realized in the mold of the injection molding device. The injection molding device has at least two different molding stations. One molding station may be realized as a demolding station, where finished articles can be removed from the index plate, while a molding step is performed at the at least one other molding station. In some embodiments three or four molding stations are realized instead of two (where in each case one molding station may be realized as a demolding station). While not usual, even more molding stations may be provided. In some embodiments, finished articles are removed while the mold is in an open position so that all molding stations are arranged for injection molding.

The term "index plate" as used herein shall include all elements that allow an indexing between a rotatable center element and several (at least two) molding stations. Thus, "index plate" does not imply that the respective element is plate-like but may also be realized as a bar-shaped indexing element (as often used for devices having two molding stations) or a cross-shaped indexing element or a frame-like indexing element etc.

The term "article" means any plastic part that can be made by injection molding processes using the herein described injection molding device.

Generally, a mold of an injection molding device has two mold halves that can be relatively moved between a closed position, in which injection molding of articles can be performed, and an open position, in which the index plate can be rotated with respect to the first and/or second mold halves. The index plate may have a number of sides, where each side is in each molding step associated with a particular molding station, i.e. in cases with two, three, or four etc. molding stations the index plate has two, three or four etc. such sides. On each of those sides, at least one projection may be arranged, which projection may be realized as a mold core (onto which the article is injection molded) or any other holding element (that is connected with the article so that the article is being held by it when the index plate is rotated) of a molding cavity so that respective part-cavities formed in the first and second mold halves form together with the associated projection of the index plate a molding cavity. The first plastic component of an article may then be injection molded onto the core and further plastic components may then be injection molded onto the semi-finished article (and onto remaining portions of the core) in order to manufacture the finished article. In an injection molding device with four molding stations (one being a demolding station), three different plastic components can molded at the three injection molding stations in order to form the final article. The projections (cores) of the index plate are then used to move the semi-finished (or finished) articles between the successive molding stations. In some embodiments, no particular projection is present and the index plate has respective cut-outs into which the different components for making the final articles are injection molded. The inner walls of the cut-outs then serve to hold the semi-finished or finished articles. Each molding station may have an identical number of molding cavities that are formed by the mold halves and the cores of the index plate, e.g. the molding stations may have one, two, four, six, eight, sixteen or thirty-two molding cavities, even though these are just some usually chosen cavity numbers for balancing of the hot-runner and other numbers of cavities (e.g. three, five, seven, twenty etc.) shall not be excluded. While the cavities at each molding station may in particular be shaped identical, it is not excluded that some or even each of the cavities is different so that different articles are made in parallel.

In order to move the index plate out of its engagement with the mold halves, the index plate is mounted on an index plate axle, which index plate axle extends through the first mold half. When the first and second mold halves are moved from a closed position into an open position, the mold halves may move relative to the index plate so that the index plate is disengaged from both mold halves or the index plate may move together with e.g. the first mold half and then (or in parallel) the index plate axle is moved linearly via the index plate axle so that the index plate disengages from the first mold half. In the disengaged position, the index plate can be rotated with respect to the first (and second) mold half. It is known in the art that the index plate can be rotated by rotating the index plate axle around its longitudinal axis. This is typically realized by a motor associated with the first mold half, which motor is drivingly coupled with the index plate axle. Often, the motor is arranged under the first mold half, so that the first mold half needs to be placed on strong stands, which is detrimental to the stability of the injection molding device.

In accordance with the present description, a drive for driving the index plate axle into rotation is placed on an additional adaptor plate. The adaptor plate has a first coupling element that is arranged eccentric with respect to the longitudinal axis of the index plate axle, i.e. eccentric with respect to the index plate axle, in particular at a certain distance. A second coupling element is arranged at the first mold half and is separably engaged with the first coupling element. In some embodiments, the first and second coupling elements are realized as a mechanical male/female coupling pair, e.g. a shaft/hub pair. In some embodiments, the first and second coupling elements are realized as a magnetic or electromagnetic coupling pair. This shall not exclude that other types of (separable) couplings are utilized such as a friction coupling having a first and second coupling element. The drive may comprise a wheel, in particular a gear wheel, and the first coupling element may comprise a wheel, in particular a gear wheel, which wheels are coupled via a first belt, in particular a V-belt or a gear belt, or a first chain. The wheels of the adaptor plate may provide a gear ratio of 1. The second coupling element may comprise a wheel, in particular a gear wheel, and the index plate axle may comprise a wheel, in particular a gear wheel, which wheels are coupled via a second belt, in particular a V-belt or a gear belt, or a second chain. The wheels of the first mold half and the index plate axle may provide a gear ratio different to 1, in particular a gear ratio of 1:2, 1:3, or 1:4. Depending on the number of molding stations and thus depending on the angular distance between the molding stations of a mold (e.g. 180 degrees, 120 degrees, 90 degrees etc.), the respective gear ratio provided by the wheel of the second coupling element and of the wheel of the index plate axle can be set. A single 360 degrees turn of the drive leading to a single 360 degrees turn of the first coupling element (at a gear ratio of 1) is thus translated into a 180 degrees turn (at a gear ratio of 1:2), a 120 degrees turn (at a gear ratio of 1:3), or a 90 degrees turn (at a gear ratio of 1:4) of the index plate axle 590 and thus of the index plate 500. The distance of the first coupling element to the longitudinal axis of the index plate axle is chosen so that the mentioned wheels and the second belt or second chain can be arranged in the first mold half. The adaptor plate 100 can then always stay the same. The gear ratio in the first mold half may be determined by in particular the wheel of the second coupling element. Thus, as a consequence, an injection molding device can be relatively fast changed from comprising a first mold having e.g. three molding stations for injection molding of first articles to a second mold having e.g. four molding stations for injection molding of second articles. The adaptor plate can remain with the other components of the injection molding device when the mold is exchanged. This allows fast changeover times of a few hours (which changeover may happen quite often, e.g. up to every three days, in order to manufacture many different articles by a single injection molding device and a plurality of different molds) and also reduces costs as the drive is then a fixed component of the frame of the injection molding device instead of the exchangeable mold.

FIG. 1 is a cross sectional cut through an injection molding device 1 (not all components of the injection molding device 1 are shown for sake of simplicity). The injection molding device 1 comprises an adaptor plate 100, a first mold half 200, a second mold half 300 that is only schematically shown by a dashed line, an index plate 500 and an index plate axle 590 that has a longitudinal axis L. The first mold half 200, the second mold half 300, and the index plate 500 together form a mold 400. The first and second mold halves 200, 300 can be moved from an open position (as shown) into a closed position by moving the first and second mold halves 200, 300 towards each other as indicated by double arrow M. If the first mold half 200 is associated with the ejector side of the injection molding device 1, then only the first mold half 200 may be moved while the second mold half 300 (associated with an injector side of the injection molding device 1) is not moved. The index plate 500 is fixedly mounted on an index plate axle 590. The index plate axle 590 is arranged for linear movement along its longitudinal axis L as indicated by double arrow A. Once the first mold half 200 is moved from the closed position into the open position, the index plate 500 may be moved simultaneously or successively from a position in which the index plate 500 is in engagement with the first mold half 200 into a disengaged position (as shown in FIG. 1A), in which the index plate 200 can be rotated relative to the first (and second) mold half 200 as indicated by arrow R.

The adaptor plate 100 comprises a drive 101 for driving a first coupling element 120 into rotation. The first coupling element 120 is arranged eccentric to the longitudinal axis L of the index plate axle 590. The adaptor plate 100 comprises a through-hole 190 through which the index plate axle 590 extends. The drive 101 comprises a motor 110 and optionally a gear, which drives a wheel 111 (here realized as a gearwheel). The wheel 111 is coupled via a first belt 112 (e.g. a gear belt) or first chain with another wheel 121 (again realized as a gear wheel), which other wheel 121 is fixedly secured with the first coupling element 120. The first coupling element 120 is mounted at the adaptor plate 100 for rotation around its longitudinal axis (e.g. the first coupling element 120 may be mounted via ball bearings at the adaptor plate 100). The wheel 111 driven by the motor 110 and the wheel 121 fixedly mounted at the first coupling element here provide a gear ratio of 1, but it is not essential that this ratio is 1 and can be any other fixed ratio.

The first mold half 200 also comprises a through-hole 290 through which the index plate axle 590 extends. The first mold half 200 comprises a second coupling element 220 that is in engagement with the first coupling element 120 of the adaptor plate 100 (which means that the second coupling element 220 is arranged at the same eccentric position with respect to the longitudinal axis L of the index plate axle 590). The first and second coupling elements 120, 220 are separable so that the first mold half 200 can be separated from the adaptor plate 100 in order to exchange it with another mold half. Here, the first and second coupling elements 120, 220 are realized as a mechanical female-male coupling pair (e.g. as a shaft-hub joint). In some embodiments, the first and second coupling elements are realized as a magnetic (or electromagnetic) coupling pair. Such magnetic clutches are e.g. available from INTORQ GmbH & Co. KG, Aerzen, Germany Mechanical and magnetic coupling may also be realized together. The second coupling element 221 is fixedly connected with a wheel 221. Another wheel 591 is fixedly connected with the index plate axle 590. The wheel 221 of the second coupling element 220 and the wheel 591 of the index plate axle 590 are coupled via a second belt 222 (e.g. a gear belt) or second chain.

Figure 2:
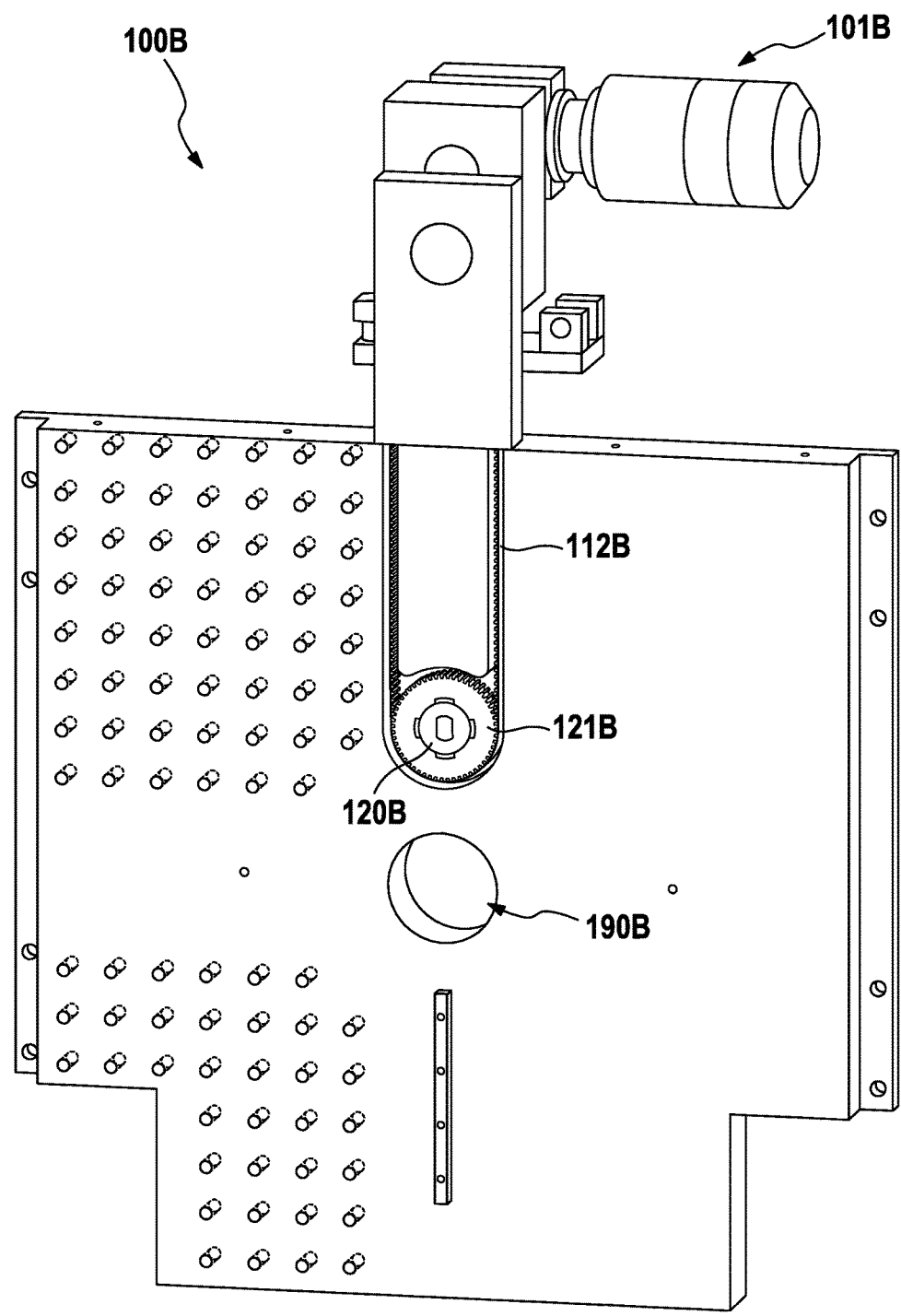
FIG. 2 is a schematic front view of an example embodiment of an adaptor plate in accordance with the present disclosure.

FIG. 2 is a view onto an isolated adaptor plate 100B. The drive 101B is arranged for driving a gear wheel (not visible in FIG. 2), which in turn is arranged for driving a wheel 121B fixedly mounted onto the first coupling element 120B (that is here realized as a female coupling partner) via a gear belt 112B. The adaptor plate 100B may comprise connection means for separably securing a first mold half to the adaptor plate 100B. A through-hole 190B is provided so that an index plate axle can extend through the adaptor plate 100B.

Figure 3:
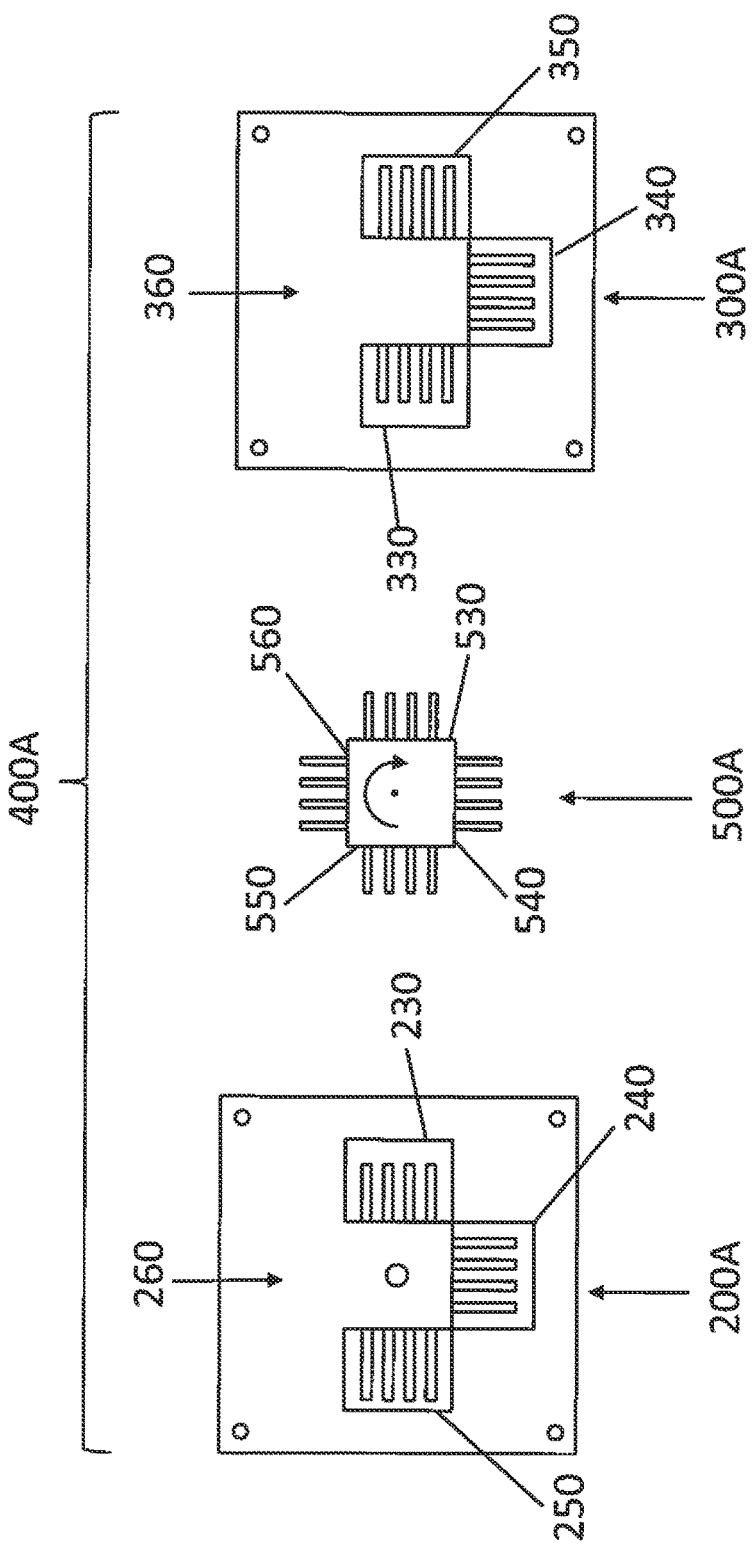
FIG. 3 is a schematic front view onto an example embodiment of a first and second mold half and an index plate (shown in offset positions and with the cavity sides of the mold halves facing the viewer)

FIG. 3 is a schematic side by side depiction of a first mold half 200A (view direction is onto the part-cavities), an index plate 500A, and a second mold half 300A (view direction is again onto the cavity-side of the second mold half 300A, so that it is understood that the second mold half 300A must be turned towards the first mold half 200A to form molding cavities) that together form a mold 400A. The mold 400A is realized as a four molding station tool, where three molding stations 230 and 330, 240 and 340, 250 and 350 are realized as injection molding stations so that three component articles can be manufactured. A fourth molding station 260 and 360 is realized as a demolding station for demolding the finished articles and removing them, while in parallel injection molding processes are performed at the three injection molding stations. The first mold half 200A has thus three molding station halves 230, 240, and 250, each molding station half having a set of four part-cavities. Accordingly, the second mold half 300A has three molding station halves 330, 340, and 350 that will cooperate with the respective three molding station halves of the first mold half, where again each molding station half has a set of four part-cavities. Consequently, the index plate 500A has four (identical) sides 530, 540, 550, and 560, each side having a set of four projections that in the closed mold 400A form cores of the injection molding cavities.

Use of the here described mold happens as follows. The two mold halves 200A and 300A and the index plate 500A are closed with the positional relationship as shown in FIG. 3. At the first molding station 230, 330, a first plastic component is then injection molded over at least a portion of each of the projections of the first side 530 of the index plate 500A, which projections are located in the cavities of the first molding station 230, 330. After the mold 400A is opened again, the index plate 500A is rotated by 90 degrees in clockwise manner with respect to the first mold half 200A so that the projections of the first side 530 of the index plate 500A will cooperate with the part-cavities of the second molding station 240, 340, while the projections of the second side 540 of the index plate 500A are located in the cavities of the first molding station 230, 330. While in the next step a second plastic component is injection molded into the cavities of the second molding station 240, 340, the first plastic component is molded over the projections of the second side 540 of the index plate 500A. In a third step, after the index plate 500A has again been rotated by 90 degrees in clockwise manner with respect to the first mold half 200A, the projections of the first side 530 of the index plate 500A are located in the cavities of the third molding station 250, 350, while the projections of the second side 540 are located in the cavities of the second molding station 240, 340 and the projection of the third side 550 of the index plate 500A are located in the cavities of the first molding station 230, 330. While now the finished three-component articles are injection molded in the cavities of the third molding station 250, 350, semi-finished two-component articles are injection molded in the cavities of the second molding station 240, 340, and semi-finished one-component articles are injection molded in the cavities of the first molding station 230, 330. In the final step, after the index plate 500A has again been rotated by 90 degrees with respect to the first mold half 200A, the projections of the first side 530 of the index plate 500A are located at the fourth molding station 260, 360, which is the demolding station. The finished three-component articles may be removed from the projections while injection molding processes are performed at the three molding stations. The whole production cycle may then continue such that in each step finished articles can be removed at the demolding station 260, 360.

Figure 4:
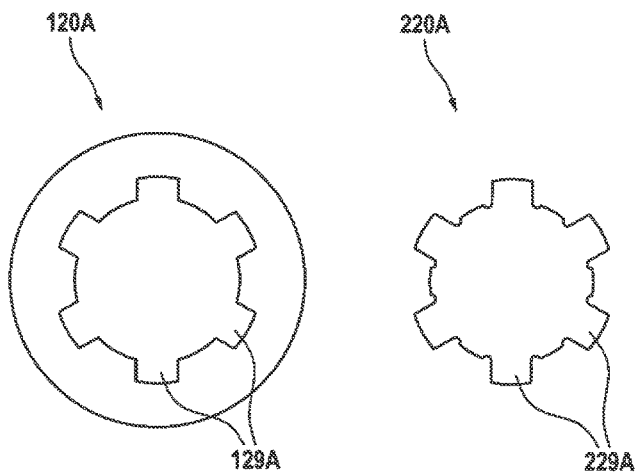
FIG. 4 is a depiction of an example embodiment of a mechanical male-female coupling pair.

FIG. 4 is a depiction of an example realization of first and second coupling elements 120A, 220A forming a male-female coupling pair. While the female first coupling element 120A is realized as a hub (or sleeve shaft) having recesses 129A radially extending from the hollow into the sleeve, the second coupling element 220A is realized as a shaft having radially extending projections 229A that cooperate with the radially extending recesses of the first coupling element 120A in the engaged state for effective and essentially play-free torque transmission from the driven first coupling element 120A to the second coupling element 220A. Any other realization of the mechanically cooperating first and second coupling elements can be considered as well, e.g. the female coupling partner may have a polygon-shaped hollow that cooperates with a matching polygon-shaped shaft as male partner.

Figure 5:
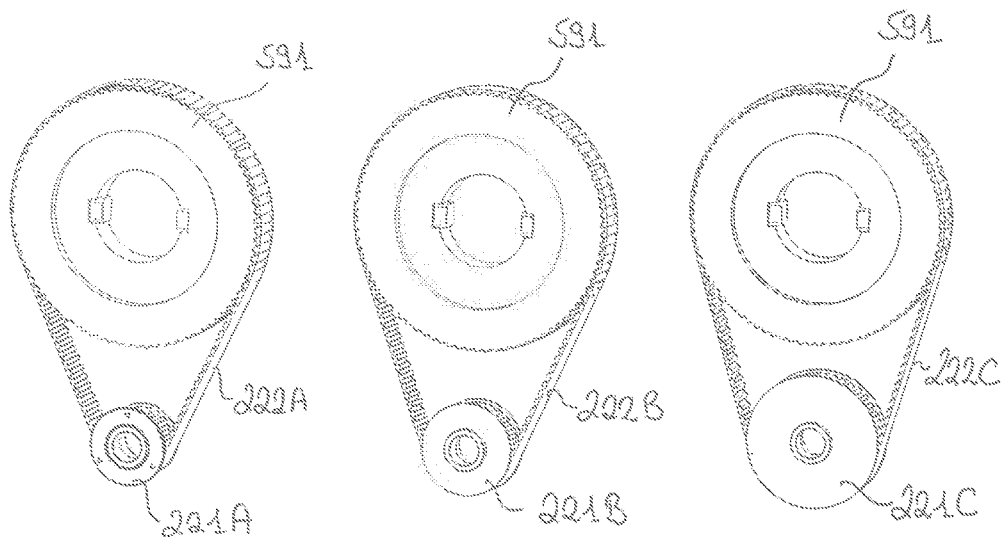
FIG. 5 shows three possibilities for gear wheel pairs in the first mold half for coupling the second coupling element with the index plate axle, which gear wheel pairs provide different gear ratios of 1:2, 1:3, and 1:4.

FIG. 5 shows three different combinations of wheels 221A, 221B, and 221C (realized as gear wheels) of the second coupling element and of the always same wheel 591 (realized as a gear wheel) of the index plate axle by which gear ratios of 1:4, 1:3, and 1:2 can be provided. The wheels are in each case coupled via a belt (realized as a gear belt) 222A, 222B, and 222C. The gear ratio is chosen such that the always same rotation (e.g. 360 degrees) provided by the first coupling element is translated into the angular rotation required by the respective mold (e.g. 180 degrees, 120 degrees, or 90 degrees) depending on the number of molding stations.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An injection molding device comprising:
   a first mold half;
   an index plate that in a molding position is at least partly received in the first mold half;
   a second mold half that together with the first mold half and the index plate forms at least two different sets of injection molding cavities, wherein each of the sets comprises at least two essentially identical injection molding cavities, and the first and second mold halves are arranged for being moved from a closed position into an open position;
   an index plate axle connected with the index plate, which index plate axle is arranged for linear movement along its longitudinal axis relative to the first mold half when the first and second mold halves are in the open position;
   an adaptor plate connected with the first mold half;
   wherein the adaptor plate comprises:
   (i) a drive placed on an additional adaptor plate,
   (ii) a first coupling element coupled with the drive, arranged eccentric with respect to the longitudinal axis of the index plate axle, and mounted at the adaptor plate for rotation around the longitudinal axis of the index plate axle, and
   (iii) a through-hole through which the index plate axle extends;
   the first coupling element is coupled with the drive by means of a first belt, a first gear belt or a first chain;
   the first mold half comprises a second coupling element engaged with the first coupling element, the second coupling element is coupled with the index plate axle by means of a second belt, a second gear belt or a second chain and gear wheels such that the second coupling element is configured for rotating the index plate axle around the longitudinal axis; and
   the index plate is configured to carry injection molded articles, to move between the molding position and a turning position by the linear movement of the index plate axle, and to rotate between a first rotation position and a second rotation position by the rotation of the index plate axle when the index plate is in the turning position.

2. The injection molding device in accordance with claim 1, wherein the adaptor plate is separably connected with the first mold half.

3. The injection molding device in accordance with claim 1, wherein the first and second coupling elements are arranged as a mechanical male-female coupling element pair.

4. The injection molding device in accordance with claim 1, wherein the first and second coupling elements are arranged as a magnetic or electromagnetic coupling element pair.

5. The injection molding device in accordance with claim 1, wherein the index plate axle extends through the adaptor plate and the first mold half.

6. The injection molding device in accordance with claim 1, wherein the drive and the first coupling element each comprise a fixedly mounted wheel, which wheels are connected via the first belt, the first gear belt or the first chain.

7. The injection molding device in accordance with claim 1, wherein the second coupling element and the index plate axle each comprise a fixedly mounted gear wheel connected via the second belt, the second gear belt or the second chain, and the gear wheels are configured to provide a gear ratio selected from the group consisting of a gear ratio of 1:2, a gear ratio of 1:3, and a gear ratio of 1:4.

8. The injection molding device in accordance with claim 1, wherein an angular difference between the first rotation position and the second rotation position is selected from the group consisting of 180 degrees, 120 degrees, 90 degrees, 72 degrees, 60 degrees, and any other value that results from an integer division of 360 degrees.

9. The injection molding device in accordance with claim 6, wherein the wheels provide a gear ratio of 1.

* * * * *